May 29, 1934.   E. S. MIX   1,961,068
COMPASS
Original Filed Nov. 30, 1931
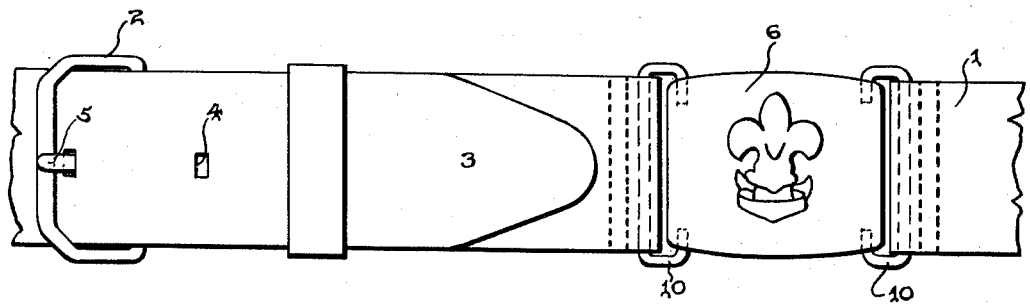
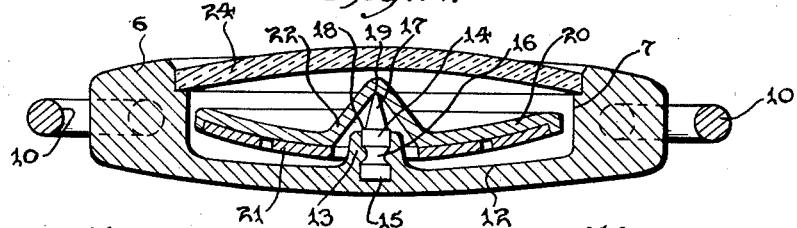
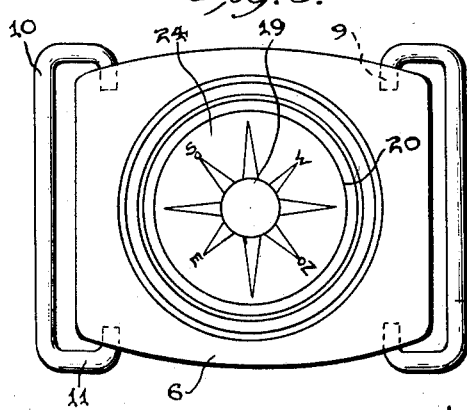 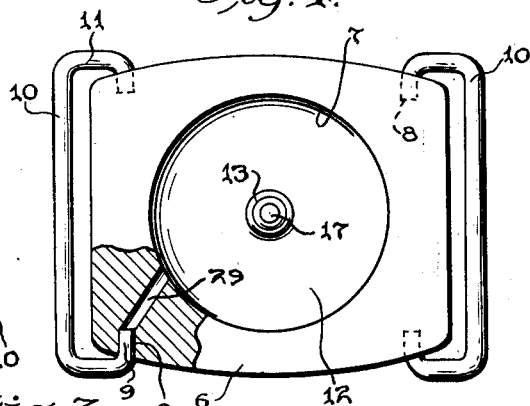
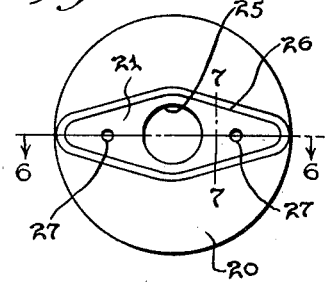
Inventor
Edwin S. Mix,
By
Attorney Patented May 29, 1934

1,961,068

UNITED STATES PATENT OFFICE 1,961,068

COMPASS

Edwin S. Mix, Rochester, N. Y., assignor to Hickok Manufacturing Company, Inc., Rochester, N. Y., a corporation of New York Original application November 30, 1931, Serial No. 578,150. Divided and this application February 26, 1932, Serial No. 595,374

13 Claims. (Cl. 33—222)

This invention relates to a compass and has for one object the provision of a compass particularly adapted to be associated with an article of wearing apparel for convenient use or observation by the user.

Another object of the invention is to provide a simple, light, practical and accurate compass designed to economize space and which may be readily attached to an article of wearing apparel or other supporting means or which may be supported or placed on a supporting surface for observation by the user.

Another object of the invention resides in the provision of a compass having a direct reading, revolving or floating dial which will automatically assume such operative or floating position when the casing or body of the instrument is in a horizontal plane and when the casing or body is in other than a horizontal plane the dial will automatically move off of its point of pivot and seat itself firmly against the walls of the casing or body in which the dial is mounted so that it will not be subjected to jar or vibration incident to violent or other movements of the casing or body and at the same time relieve the pivot of strain.

Another object of the invention is to provide a compass or other similar delicate instrument of a character equipped with a crystal and in which the crystal is adapted to be snapped into place into a bezel seat therefor like the crystal of a watch and capable of being easily and quickly removed by introducing compressed air beneath the crystal and blowing off the latter, thereby obviating the necessity of employing instruments for this purpose and also obviating the injury liable to result either to the crystal or the casing from the use of instruments in attempts to remove the crystal.

A further object of the invention is to provide a compass dial having a curved surface to which a curved needle is applied.

It is still further designed to provide a compass in which the center of gravity of the floating dial will be lowered to reduce the thickness of the compass and at the same time produce a correspondingly steadier action without interfering with the free swinging or rotary movement of the dial necessary for accurate operation of the instrument and thereby obtain both an accurate and a thin compass especially adapted for portable or stationary purposes.

It is still further designed to provide a compass of the nature stated, embodying among other characteristics, a new form of magnetic needle particularly adapted for coaction with a curved supporting surface therefor.

With the above and other objects in view the invention consists in the novel combination and arrangement of parts hereinafter fully described, illustrated in the accompanying drawing, and pointed out in the claims hereto appended, it being understood that various changes in the form, proportion and minor details of construction within the scope of the appended claims may be resorted to without departing from the spirit or sacrificing any of the advantages of the invention.

In the drawing:

Figure 1 is a front elevation of a portion of a compass belt constructed in accordance with this invention.

Fig. 2 is a central longitudinal sectional view of the same.

Fig. 3 is an enlarged elevation of a compass viewed from the inner face thereof.

Fig. 4 is an elevation of the body or casing, part of it broken away at one corner of the same to illustrate the air passage.

Fig. 5 is a detail reverse plan view of the compass dial and the magnetic needle.

Fig. 6 is a detail sectional view of the same on the line 6—6 of Fig. 5.

Fig. 7 is a detail sectional view on the line 7—7 of Fig. 5.

Fig. 8 is an edge view of the dial and magnetic needle.

In the accompanying drawing there is illustrated my improved type of compass and which is shown as carried or supported by a belt for personal wear but it will be understood that the invention in this case goes to the compass itself irrespective of how it may be supported, the same being equally adaptable for portable as well as for stationary use. It will also be understood that this application is a division of the application filed by me on November 30, 1931, Serial No. 578,150. With these thoughts in mind and referring now more specifically to the accompanying drawing, the reference character 1 designates a belt or other article of personal wear, preferably a belt, having a buckle 2 at one end and provided at its other end 3 with holes to receive the tongue 5 of the buckle in the usual manner.

The belt is provided adjacent the buckle end with a compass having a body 6 of bakelite or other suitable plastic material, but any suitable material may of course be employed in the construction of the body of the compass. The body which is provided with a circular chamber 7 constitutes the casing of the compass and is substantially oblong and is slightly tapered in thickness at its ends, as clearly illustrated in the drawing.

The body or casing is provided at its ends at opposite sides with bearing recesses 8 for the reception of internal inturned terminals or journals 9 of swinging bars 10 consisting of loops or bails constructed of suitable metal and each consisting of a straight piece of metal having its terminals bent at right angles to form approximately L-shaped end portions 11 to provide the said journals 9 and to form loops of the said bars 10 to receive the adjacent portions or sections of the belt. The adjacent portions or sections of the belt may be passed through the loops and around the bars 10 and stitched or otherwise secured to confine the bars within the adjacent portions or sections of the belt. Any other suitable means may, however, be employed for connecting the ends of the body 6 with the adjacent portions of the belt.

When the compass is arranged in a horizontal position, as illustrated in Fig. 2 of the drawing, the bottom wall 12 of the chamber 7 is slightly curved as shown and is provided with an inwardly projecting boss 13 in which is molded a pivot pin 14 forming the pivot of the compass and consisting of a shank 15 of substantially cylindrical form provided intermediate of its ends with an annular groove 16 into which the bakelite flows in the molding of the body whereby the pivot pin is keyed in the bakelite. The pin is provided with a projecting conical pivot portion 17 and has an annular shoulder 18 surrounding the base of the conical pivot portion and adapted to facilitate the accurate placing of the pivot pin in the mold which forms the bakelite body 6.

The conical pivot portion 17 of the pin 14 is adapted to fit in a cone bearing 19 of a concavo convex dial 20 constructed preferably of bakelite or other suitable plastic material and carrying a magnetic needle 21 which is molded in the bakelite of the concavo convex dial as an insert during the operation of molding the said dial. The concavo convex dial which presents a concave upper face and a convex lower face has a hollow central conical portion 22 forming the said cone bearing and adapted to permit a free floating action of the dial 20 which is a direct reading dial and which in practice will have the cardinal and other points of the compass engraved or otherwise marked on its upper concave face.

In practice the bakelite dial will be molded with highly polished molds and under a sufficient heat to produce a highly polished surface and it has been found in practice that with dials of this construction it is not necessary to provide crystal bearings for the pivot pin but if desired a crystal bearing 23 may be provided, as indicated in Fig. 6 of the drawing. This hard surface is characteristic of bakelite in that the gums contained in the material tend to gravitate towards the surface producing an intensely fine hard grain under the action of a baking heat essential to this type of product.

The concavo convex disk presents a lower convex surface to the bottom wall of the chamber 7 and with its centrally arranged hollow cone lowers the center of gravity and eliminates the major portion of the clearance which usually occurs between floating dials and the bottom walls of chambers in which they are mounted and thereby reduces the thickness of the compass and provides a comparatively very thin compass which is especially adapted for use in belts for personal wear.

This curvature of the dial enables a much thinner over all assembly to be constructed than has been possible with compasses having dials of the ordinary construction and at the same time free movement and accuracy of operation are assured by such construction.

Also the lowering of the center of gravity provides greater steadiness in the floating action of the dial of the compass when the same is in a horizontal position and permits the bearing portion of the hollow cone to slide off the end of the pivot pin when the compass is arranged in its normal vertical position. This will enable the dial to rest against the crystal 24 and also the wall of the chamber at the bottom thereof and to be seated in a firm supported position practically independently of the pivot pin thereby preventing floating movement or vibration of the dial when the same is not in use and at the same time relieving the point of the pivot pin of strain. The portions of the belt with which the compass is connected are adapted to be twisted a half turn to carry the compass from a vertical position, such as is illustrated in Fig. 1 of the drawing, to the horizontal position shown in Fig. 2. When the compass is in its normal vertical position the dial is held against movement, but when the belt is partially twisted to arrange the compass in a horizontal position the dial automatically seats itself in a floating position upon the end of the pivot pin.

The magnetic needle 21 which is constructed of magnetic metal in sheet form is oppositely tapered, as clearly illustrated in Fig. 5 of the drawing, and is provided with a central opening 25 which is of the same diameter as the base of the hollow cone 22 to permit the boss 13 and the pivot pin to extend into the hollow cone.

This brings the lower face of the magnetic needle in close proximity to the bottom wall of the chamber 7 but at the same time provides all the clearance that is necessary for an accurate floating operation of the dial. The magnetic needle is curved longitudinally to present a concave upper face and a convex lower face to conform to the configuration of the lower face of the dial 20 and it is molded in the bakelite of the dial in the formation of the latter as an insert thereof. The bakelite provides a marginal bead 26 around the entire periphery of the magnetic needle 21 which is keyed in the bakelite by a marginal burr formed by stamping out the magnetic needle. An integral unit is thereby formed of the dial and the magnetic needle. The magnetic needle is provided at the end portions with holes 27 spaced from the central opening 25 and adapted to receive mold pins for properly positioning the magnetic needle in the mold with relation to the engraving or other markings of the cardinal points and other points of the compass on the upper concave face of the dial.

The crystal 24 which is preferably of the non-breakable type is preferably of the concavo-convex type and is seated in an annular groove 28 forming a bezel seat that is provided by an annular shoulder for the crystal and an inclined wall to retain the crystal on the seat. The crystal is snapped into the groove or bezel seat similar to a watch crystal and should it be desired to remove the crystal during manufacture of the compass or to correct adjustment or any other purpose, compressed air through a suitable source of supply is introduced into the chamber 7 which is behind the concave face of the crystal for the purpose of blowing the crystal off its seat. As a matter of fact the pressure of air or other fluid supplied to said chamber serves to outwardly flex the crystal due to the pressure applied to the rear face of the crystal and this pressure is applied until the crystal is completely separated from the bezel seat and consequently separated from the body member wherein the chamber is provided.

The body 6 is provided at one of its corners with an air passage 29 extending from the exterior of the body, to-wit, from one of the bearing recesses 8 to and communicating with the chamber 7. This will enable compressed air to be introduced into the chamber 7 under sufficient pressure to blow the crystal off its seat. Compressed air may be readily applied to the chamber 7 before the swinging bar 10 is assembled on the body but if it should become necessary to use the air passage after the end bars 10 have been assembled the one at the passage 29 may be readily removed to expose the passage 29 which is concealed when the compass is assembled in the belt. Also the bar 10 may be readily removed to enable compressed air to be applied to the chamber for blowing the crystal off the body or casing when required for repairs or replacements.

The open face of the compass by being located at the inner face of the belt assures protection of the compass by the body of the wearer and at the same time presents the solid unbroken outer face of the body of the casing exteriorly of the belt at the outer face of the same. The outer face of the body or casing may be ornamented with an insignia or any other suitable ornamentation and the color of the bakelite may be made to harmonize with the material of the belt. The compass may be arranged to form either a right hand or left hand belt as will be readily understood.

While the invention is shown as particularly adapted for application to a belt for personal wear, it will be understood that the compass may be applied or supported in any other suitable manner and that as a matter of fact it may be supported or placed on any stationary supporting surface for observation by the user.

What is claimed is:

1. A compass comprising a relatively thin casing provided with a chamber, an upwardly or forwardly extending pivot mounted in the structure providing said chamber, a dial mounted on said pivot, said dial having compass points located thereupon and provided with a magnetic needle rigidly connected with the dial to form a single unit, said dial having a depressed central portion and a raised peripheral portion and also provided with a centrally arranged hollow bearing projecting upwardly or forwardly from the face of the dial, said centrally arranged hollow bearing receiving within the hollow under side thereof said pivot and being constructed so as to permit the floating of the periphery of the disk in a vertical direction towards and from the bottom wall of the chamber, the construction being such that due to the centrally arranged hollow bearing and due to the depressed central portion of the dial the center of gravity of the pivotally mounted dial member is low, so that the normal clearance between the under side of the dial and the bottom of the chamber is reduced to a minimum and so that the peripheral portion of the dial has a relatively large amount of freedom of movement both above and below its normal position, the pivot support being substantially above the upper level of the peripheral portion of the dial.

2. A compass comprising a relatively thin casing provided with a chamber, a crystal defining the front portion of the chamber, a bottom or back wall defining the back portion of the chamber and a peripheral wall extending forwardly or upwardly from the back wall of the chamber, upon which peripheral wall the crystal is located, said casing also having a pivot mounted in the wall defining the bottom or back portion of the chamber, the compass also comprising a dial having compass points marked thereupon and provided with a magnetic needle rigidly connected with the dial to form a single unit, said dial having a depressed central portion and a raised peripheral portion and being provided at the center with a hollow protuberance having at the under side thereof a conical recess for receiving said pivot and forming a bearing for the dial, which protuberance in conjunction with the depressed central portion of the dial causing the center of gravity of the dial to be relatively low as compared with the peripheral portion of the dial and as compared with the pivotal bearing, the arrangement between the dial and the bottom of the chamber being such that only a small clearance is left between the bottom of the chamber and the lower central portion of the dial.

3. A compass comprising a relatively thin casing provided with a chamber and having a pivot mounted therein, a concavo-convex compass dial presenting a concave upper face and forming a depressed center and raised periphery and provided at its center with a protuberance having at the under side thereof a conical recess forming a bearing for the pivot and receiving the same, and a curved magnetic needle fitting the convex lower face of the dial and rigidly connected with the same to form a single unit.

4. A compass comprising a casing having a back, a peripheral wall extending forwardly from the back and a crystal suitably held in and at the forward portion of the peripheral wall whereby a relatively shallow chamber is provided within the wall portion between said back and crystal, said compass having a pivot mounted in and extending forwardly from the back, and a concavo-convex compass dial swingably mounted on said pivot and presenting a concave upper face, said dial having a forwardly extending centrally located conical protuberance which is hollow on its under side so as to form a bearing for receiving the pivot, said dial consisting of molded plastic material and having a curved magnetic needle fitting the convex lower face of the dial, and which magnetic needle is molded partially in the material of the dial as an insert so as to form a single swingable compass dial unit.

5. A compass comprising a casing provided with a chamber and having a pivot mounted therein, and a concavo-convex compass dial presenting a concave upper face and provided with a hollow substantially conical protuberance forming a bearing for and receiving the pivot, said dial consisting of molded plastic material, and a curved magnetic needle fitting the convex lower face of the dial and molded in the same as an insert to form a single unit, said dial being also provided with a marginal bead surrounding the magnetic needle.

6. A compass comprising a casing provided with a chamber and having a pivot mounted in the back portion of the casing and extending forwardly therefrom and having a pointed forward end and a concavo-convex compass dial presenting a concave upper or forward face and provided with a hollow substantially conical upwardly extending protuberance forming on the under side thereof a bearing recess for and receiving the upper or forward pointed end of the pivot, said dial consisting of molded plastic material and having associated therewith a curved magnetic needle fitting the convex lower face of the dial and molded in the same as an insert to form a single unit, said dial also being provided with a marginal bead surrounding the magnetic needle and the latter having a marginal burr keying the needle in the plastic material, the under side of said dial being defined by radial surface elements that slope upwardly and outwardly from the lower under side of said protuberance.

7. A compass comprisng a casing provided with a compass needle receiving chamber and having an upstanding pivot mounted therein and which pivot is constructed so as to provide a pointed front or upper end, a concavo-convex compass dial located within said chamber and presenting a concave upper face and provided with a hollow substantially conical upstanding central protuberance forming on the under side thereof a bearing recess wherein the pivot pin is received. said dial consisting of molded plastic material and having associated therewith and as a part thereof a magnetic needle consisting of a curved member partially molded into the dial at the lower face thereof, which magnetic needle is provided with a central opening located at the base of the hollow conical protuberance.

8. A compass comprising a relatively thin casing of molded plastic material provided with a circular chamber and having a centrally arranged projecting boss, a central pivot having a shank molded in the said boss, a compass dial of concavo-convex form presenting a concave upper face and provided at the center with a hollow conical bearing receiving the pivot and the boss, and a magnetic needle consisting of a curved plate molded in the plastic material of the dial at the lower face thereof to form a single unit.

9. A compass comprising a relatively thin casing of molded plastic material provided with a circular chamber and having a centrally arranged projecting boss, a pivot having a shank molded in the said boss and provided with a groove to key the pivot in the plastic material, said pivot being also provided at the upper end of the shank with a flat mold engaging surface, a plastic concavo-convex compass dial provided with a central hollow conical bearing receiving the pivot and the boss, and a compass needle consisting of a curved plate molded into the material of the dial and fitting the lower face of the same, said compass needle being provided with spaced openings adapted to receive means for positioning the needle in a mold.

10. As an article of manufacture, a concavo-convex compass dial providing a peripheral portion and a central portion depressed with respect to the peripheral portion to lower the center of gravity with respect to the pivot point and constructed so as to permit the compass dial to slide off a pivot when the compass is turned from a horizontal position, said dial having at the under side thereof a pivot receiving recess, and a curved magnetic needle fitting the convex lower face of the dial and rigidly connected with the same to form a single unit.

11. As a new article of manufacture, a concavo-convex compass dial having a curved surface and forming a depressed center and a raised periphery and constructed so as to lower the center of gravity with respect to the pivot point and so as to permit the dial to slip off a pivot when the compass is turned from a horizontal position, said dial having a pivot receiving recess at the under side thereof and also having a curved magnetic needle fitting the curved surface of the dial and molded in the dial as an insert to form a single unit.

12. A compass construction which when in use comprises a chamber body member and therein a magnetic needle member which is floatingly but pivotally mounted upon the upper end of a pivot pin which in turn is carried by said body member, said body member being relatively thin or shallow as compared with its length and breadth and having a relatively horizontally extending back upon and by which the pivot pin is mounted, which pivot pin has an upwardly tapering conical portion and is carried by said body member in such a manner that it extends upwardly from said back, said body member having a peripheral wall that extends upwardly from said back, said compass construction also comprising a crystal secured in place at the upper end of said peripheral wall whereby a chamber is provided within said peripheral wall and which chamber is relatively shallow and is located between said crystal and said back, said magnetic needle member having at the under side thereof an upwardly extending hollow central conical section the interior under portion of which conical section rests upon the upper end of the pivot pin and is constructed so as to have a slight clearance between the uppermost exterior of the conical section and the under face of the crystal, so as to have a slight clearance between the under surface of the central conical section and said back and so as to have a substantial clearance between the downwardly and outwardly extending inner surface elements of the central conical section and said pivot pin and carrying construction therefor whereby said magnetic needle can freely float relative to said pivot, said magnetic needle member being constructed so that the under surface elements thereof extend outwardly from said central conical section and thence upwardly and gradually away from the upper face of the back, the extreme pole ends of said needle member being located so that when said needle member is symmetrically positioned with respect to the back said pole ends each occupy a position substantially midway between said crystal and said back, the upper plane for the extremity of the pole ends being located below the place where the conical section rests upon the upper end of the pivot pin.

13. A compass construction as defined in and by the claim last preceding and in which the floating but pivotally mounted magnetic needle member comprises the magnetic needle proper and a concavo-convex dial member of suitable plastic material arranged so as to present a concave upper face and a convex lower face and constructed so as to provide the hollow central conical portion that extends upwardly from the concave rear face portion of the dial, which said dial of plastic material and said magnetic needle proper are assembled in such a manner that the needle is embedded in said disk and so as not to substantially extend beyond the general surface formation of the disk.

EDWIN S. MIX.